M. T. Wickersham.
Street Sweeper.
Nº 45,548.      Patented Dec. 20, 1864.
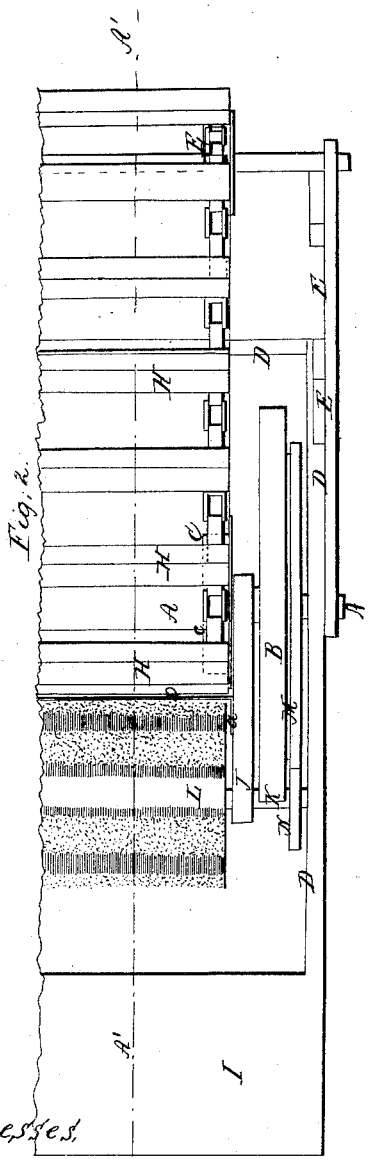
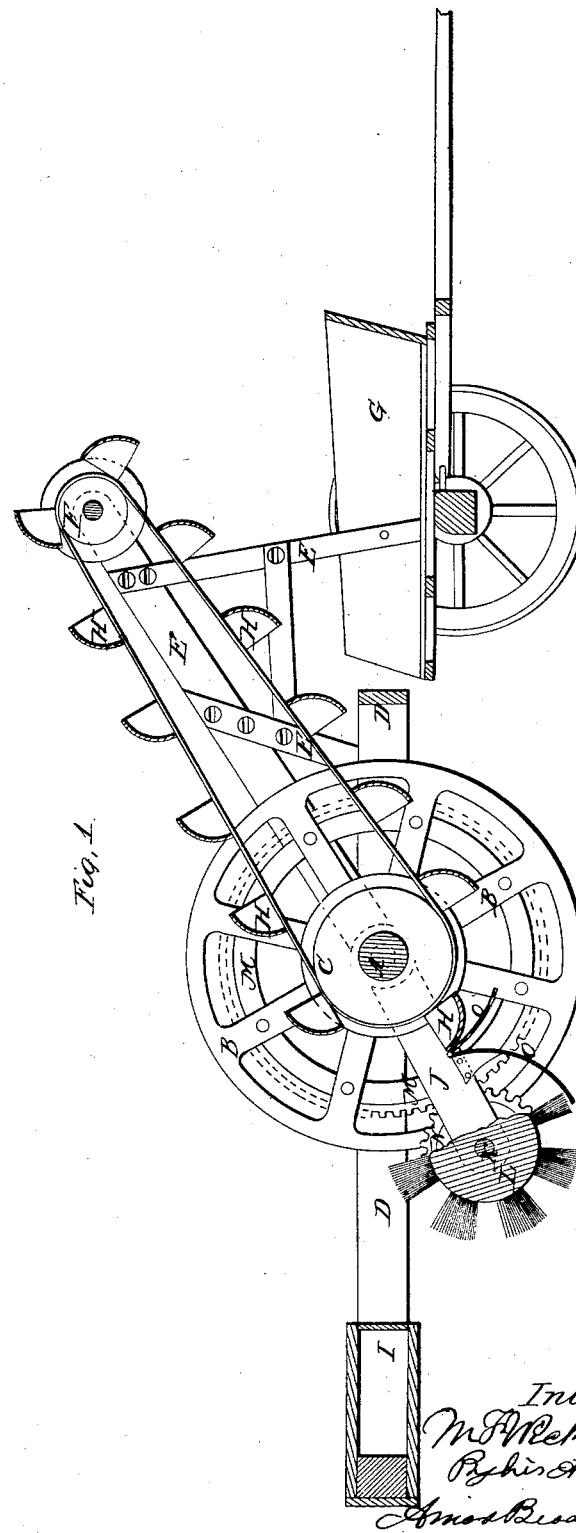

UNITED STATES PATENT OFFICE.

M. F. WICKERSHAM, OF SPRINGFIELD, ILLINOIS.

IMPROVEMENT IN STREET-SWEEPING MACHINES.

Specification forming part of Letters Patent No. 45,518, dated December 20, 1864; antedated December 25, 1862.

*To all whom it may concern:*

Be it known that I, M. F. WICKERSHAM, of Springfield, Sangamon county, in the State of Illinois, have invented a new and Improved Street-Sweeping Machine; and I do hereby declare the following to be a full, clear, and exact description of the same, reference being had to the annexed drawings, making part of this specification, in which—

Figure 2 shows a top view of a little more than half of my machine; and Fig. 1, a vertical section taken on the line A'.

The following description will enable any one skilled in the arts to which my invention appertains, to make and use the same.

Like letters of reference represent like parts of the different figures of the drawings annexed.

A represents the main axle of the machine, on which the tench wheels B are permanently keyed, as are also a pair of chain-wheels, C. D is the main frame of the machine, resting on the main axle. E is a frame erected on the front end of the main frame, for the purpose of overhanging the front end thereof and for the purpose of supporting a chain-wheel or drum, F, in an elevated position, so that a common cart, G, can be backed thereunder. H H, &c., are a series of buckets, fixed on an endless chain, leading around the chain-wheels aforesaid.

The main frame extends rearward, and a box, I, is made therein, which may be loaded. The object of this is to counterbalance the weight of the frame E so that it may be easily lifted out of the cart-body, in which it rests, in the manner shown, and to which it may be secured in any convenient way. The cart is of the ordinary dumping kind, and needs no special description.

J represents a frame the upper end of which hangs on the main axle, so as to vibrate freely around it as a center. In the lower end of this frame the axles K of the revolving brush L has its journal-bearings.

M represents a cog-wheel bolted to the main truck-wheel. This cog-wheel gears in a pinion, N, fixed on the axle of the brush. The cogs of the wheel M is shown in the drawings but a short distance; but they, of course, continue all the way around, as indicated by the red lines.

*o* is a curved plate, fixed to the frame J at *a*, up which the dirt is swept into the buckets H H.

By this arrangement it will be seen that the brush is left perfectly free to follow the surface of the ground. It can rise and fall in and out of the holes in the street irrespective of the position of the truck-wheel without throwing it out of gear or in any way interfering with its operation.

I do not intend to confine my patent to the particular arrangement or proportion of parts shown by the drawings, as the brush may be operated in a variety of ways by the use of intermediate gearing; but the main thing is to have the brush so arranged in respect to the elevating-buckets and truck or driving wheels that it can throw the dirt in the buckets and at the same time rise and fall, so as to follow the uneven surface of the ground without disuniting the gearing that operates it.

Having now described the construction and operation of my machine, I claim and desire to secure by Letters Patent—

1. The combination of the main frame D with the overhanging frame E and elevating-buckets H, when the rear end of said main frame is made to extend so as to counterbalance the frame E' with its buckets H and chain-wheel F and furnish a purchase by which said overhanging frame may be raised or lowered.

2. The combination of the vibrating brush-frame J with the elevating-buckets H and driving-wheel M, so that the brush can move up or down without ungearing, and at the same time throw the dirt in the buckets, as set forth, while it follows the uneven surface of the ground.

M. F. WICKERSHAM.

Witnesses:
AMOS BROADNAX,
HENRIETTA G. BROADNAX.